(12) United States Patent
Ogawa

(10) Patent No.: US 7,211,942 B1
(45) Date of Patent: May 1, 2007

(54) RADIATION IMAGE CONVERSION PANEL

(75) Inventor: Hiroshi Ogawa, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 09/560,819

(22) Filed: Apr. 28, 2000

(30) Foreign Application Priority Data

Apr. 28, 1999 (JP) ................................ 11-121930

(51) Int. Cl.
*H01J 29/10* (2006.01)
*G21K 4/00* (2006.01)

(52) U.S. Cl. ...................... 313/467; 313/461; 313/469; 250/483.1; 250/484.1; 427/65; 427/157; 428/690

(58) Field of Classification Search ................ 313/467, 313/461, 469; 250/483.1–487.1; 252/301.4 R
See application file for complete search history.

(56) References Cited

U.S. PATENT DOCUMENTS

| | | | | |
|---|---|---|---|---|
| 4,574,102 A | * | 3/1986 | Arakawa et al. | 250/483.1 |
| 4,704,538 A | * | 11/1987 | Kitada | 250/486.1 |
| 4,922,105 A | * | 5/1990 | Hosoi | 250/484.4 |
| 4,979,200 A | * | 12/1990 | Umemoto et al. | 378/185 |
| 5,153,078 A | * | 10/1992 | Kojima et al. | 428/690 |
| 5,519,228 A | * | 5/1996 | Takasu et al. | 250/484.4 |
| 5,591,982 A | * | 1/1997 | Kohda | 250/484.4 |
| 5,743,977 A | * | 4/1998 | Suzuki et al. | 156/230 |
| 5,789,021 A | * | 8/1998 | Dooms et al. | 250/483.1 |
| 5,877,503 A | * | 3/1999 | Neriishi | 250/484.4 |
| 5,877,504 A | * | 3/1999 | Yanagita et al. | 250/484.4 |
| 6,486,477 B1 | * | 11/2002 | Suzuki et al. | 250/483.1 |

FOREIGN PATENT DOCUMENTS

| | | | |
|---|---|---|---|
| EP | 866469 A1 | * | 9/1998 |
| JP | A59126299 | | 7/1984 |
| JP | A59126300 | | 7/1984 |
| JP | 08-136699 A | | 5/1996 |
| JP | 08120264 A | * | 5/1996 |
| JP | 08313699 A | * | 11/1996 |
| JP | 2001042096 A | * | 2/2001 |

* cited by examiner

*Primary Examiner*—Sikha Roy
(74) *Attorney, Agent, or Firm*—Birch, Stewart, Kolasch & Birch, LLP

(57) ABSTRACT

There is provided a radiation image conversion panel having a sufficient quantity of emitted light and high graininess. The radiation image conversion panel has a phosphor layer containing a stimulable phosphor and a binder. The phosphor layer has at least two layers, and an amount or weight of a binder to a stimulable phosphor in an uppermost layer of the phosphor layer is greater than that of a binder to a stimulable phosphor in other layer than the uppermost layer.

13 Claims, 1 Drawing Sheet

RADIATION IMAGE CONVERSION PANEL

BACKGROUND OF THE INVENTION

1. Field of the Invention

The present invention relates to a radiation image conversion panel using a stimulable phosphor.

2. Description of the Related Art

As a method which can replace conventional radiography, a radiation image conversion method using a stimulable phosphor is described, for example, in Japanese Patent Application Laid-Open (JP-A) No. 55-12145. This method utilizes a radiation image conversion panel containing a stimulable phosphor (also referred to as an accumulative phosphor sheet). In this method, radiation transmitted through a subject or emitted from an object to be examined is absorbed into the stimulable phosphor of the above-mentioned panel, and the stimulable phosphor is excited by an electromagnetic wave (stimulating ray) such as visible light or infrared light in a time sequential manner so as to allow radiation energy accumulated in the stimulable phosphor to emit as fluorescent emission (stimulated emission). Subsequently, an electric signal is obtained by photoelectrically reading the fluorescence, and based on the obtained electric signal, a radiation image of the subject or object to be examined is reproduced as a visible image.

The above-described radiation image conversion method provides an advantage that a radiation image having abundant information can be obtained by a radiation dosage far smaller than that in conventional radiography using a combination of a radiographic film and sensitized paper. Accordingly, this method is of great value of utilization particularly in direct medical radiography such as X-ray photography used for diagnostic purposes.

The radiation image conversion panel used in the radiation image conversion method has a basic structure comprised of a support and a phosphor layer provided on one side of the support. However, the support is not necessarily needed if the phosphor layer is a self-supporting layer. Further, the surface of the phosphor layer opposite to the side at which the support is located (i.e., the surface of the phosphor layer which does not face the support) has generally a transparent protective layer to thereby protect the phosphor layer from chemical deterioration or physical impact.

Generally, the phosphor layer is comprised of a stimulable phosphor and a binder which contains and supports the phosphor in a state of dispersion. When the stimulable phosphor is irradiated with stimulating ray after having absorbed radiation such as X-rays, it exhibits the property of stimulated emission. Accordingly, the radiation transmitted through a subject or emitted from an object to be examined is absorbed in the phosphor layer of the radiation image conversion panel in proportion to the amount of the radiation, and a radiation image of the subject or the object to be examined is formed as an image of accumulated radiation energy in the radiation image conversion panel. The accumulation image can be released as stimulated emission light by the irradiation with stimulating ray, and photoelectrically reading the stimulated emission light and converting the same into an electric signal, so that the radiation energy accumulation image can be made into a visible image.

The radiation image conversion method is, as described above, a greatly advantageous image formation method. A radiation image conversion panel used by the radiation image conversion method is desirably one having a high sensitivity and providing an image of excellent image quality (sharpness, graininess, and the like) as well as sensitized paper used by conventional radiography. The sensitivity of the radiation image conversion panel basically depends on a total quantity of stimulated emission light of a stimulable phosphor contained in the radiation image conversion panel, and the total quantity of emission light varies not only due to light emission intensity of the phosphor itself, but also due to an amount of the stimulable phosphor contained in the phosphor layer. If the amount of the stimulable phosphor contained is large, the phosphor layer absorbs a large amount of radiation such as X-rays. Therefore, the sensitivity of the panel can be made higher, and simultaneously, the image quality (particularly, graininess) of the panel improves. On the other hand, when the amount of the stimulable phosphor contained in the phosphor layer is constant, a layer thickness of stimulable phosphor grains can be made thinner as packing density of the phosphor grains becomes greater. As a result, spread of stimulating ray caused by scattering can be reduced and relatively better sharpness can be obtained.

There has recently been increased demand for improved image quality, and therefore, a radiation image conversion panel obtained by forming a phosphor layer on a support and by compressing the phosphor layer is disclosed in JP-A Nos. 59-126299 and 59-126300. The radiation image conversion panel thus obtained allows, by compression processing of the phosphor layer, density of a stimulable phosphor in the phosphor layer to become greater than that in conventional radiation image conversion panels.

SUMMARY OF THE INVENTION

Even the above-described technique did not sufficiently meet the demand made in recent years for better image quality.

Particularly, if the grain size of the stimulable phosphor to be used is small, excellent graininess and sharpness can be obtained. However, the quantity of emission light decreases, and therefore, the signal-to-noise (S/N) ratio becomes adverse. In contrast, if the grain size is large, the quantity of emission light is also large. However, in this case, the graininess cannot be improved. Accordingly, it is difficult to simultaneously achieve a sufficient or optimum quantity of emission light and a high-level graininess.

Accordingly, an object of the present invention is to provide a radiation image conversion panel providing a sufficient quantity of emission light and having a high graininess. Specifically, a radiation image conversion panel in which graininess noise can be reduced without decreasing the quantity of emission light and a radiation image of excellent image quality can be obtained.

The present inventors have focused on that the phosphor layer is divided into two or more layers having different characteristics, and further researched. As a result, they have devised the invention discussed herein.

According to a first aspect of the present invention, there is provided a radiation image conversion panel comprising at least two phosphor layers each containing a stimulable phosphor and a binder, wherein an amount (by weight) of the binder to the stimulable phosphor in uppermost phosphor layer of the phosphor layers is greater than that of the binder to the stimulable phosphor in any other phosphor layers.

According to a second aspect of the present invention, the radiation image conversion panel is constructed in such a manner that the amount (weight) of a binder to a stimulable phosphor in the uppermost layer of the phosphor layer is greater than that of the binder to a stimulable phosphor in any other phosphor layers by at least 0.5 wt %.

In the radiation image conversion panel according to the present invention, the phosphor layer is comprised of at least two layers and the amount of the binder in the uppermost layer of the phosphor layer to the stimulable phosphor is greater than that of the binder in any other layers. Therefore, at least one of layers other than the uppermost layer is allowed to have function of emitting a large quantity of light and the uppermost layer is allowed to exhibit high graininess. As a result, the radiation image conversion panel of the present invention is excellent in emission of a sufficient quantity of light, and the graininess, and also has a desired S/N ratio.

DESCRIPTION OF THE PREFERRED EMBODIMENTS

The present invention will hereinafter be described in detail with reference to an embodiment thereof.

A radiation image conversion panel of the present invention is usually formed with a phosphor layer being provided on a support, and when necessary, a protective layer, a colored layer, an edge covering layer, and the like may be selectively provided.

Various structural parts of the radiation image conversion panel of the present invention will first be described in detail.

(Phosphor Layer)

A phosphor layer contains at least a stimulable phosphor and a binder, and when necessary, various additives may be selectively added.

The phosphor layer is comprised of at least two layers, and the amount of a binder to a stimulable phosphor contained in the uppermost layer of the phosphor layer is greater than that of a binder to a stimulable phosphor contained in each of other layers than the uppermost layer. The upper most layer is a phosphor layer which is nearest to the side at which a radiation such as X-ray irradiates. Due to this structure, the graininess can be improved and graininess noise can be reduced in the uppermost layer of the phosphor layer, which has the greatest influence on the graininess noise while maintaining a predetermined quantity of emission light in at least one of the other layers. As a result, a radiation image having excellent image quality can be obtained.

The amount of the binder to a stimulable phosphor in the uppermost layer of the phosphor layer is preferably greater than that to a stimulable phosphor in each of layers other than the uppermost layer by 0.5 percent by weight ("wt %") or more, particularly preferably 1.0 wt % or more. If the former is greater than the latter by about 100 wt % or more, there may be cases in which such adverse effect that the quantity of emitted light per thickness of the layer decreases be apt to occur.

The amount of the binder to a stimulable phosphor in each layer of the phosphor layer varies due to desired characteristics of the radiation image conversion panel, the kind of a phosphor, and the like. The amount of the binder is preferably selected from a range from 1 to 100 wt %, more preferably a range from 2.5 to 12.5 wt %.

Figure 1A:
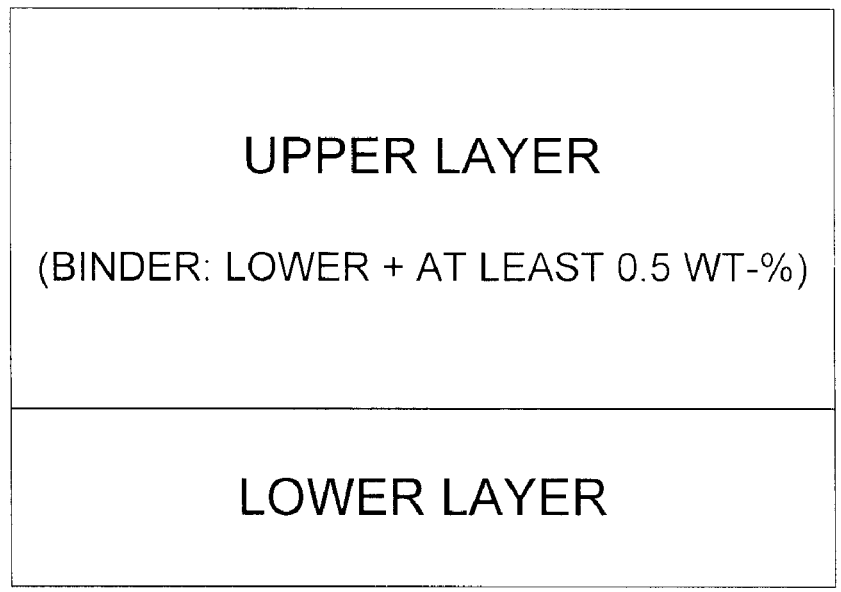
FIGS. 1A and 1B are schematic representations of features of the invention involving the thickness of at lest two phosphor Layers in the panel.
Figure 1B:
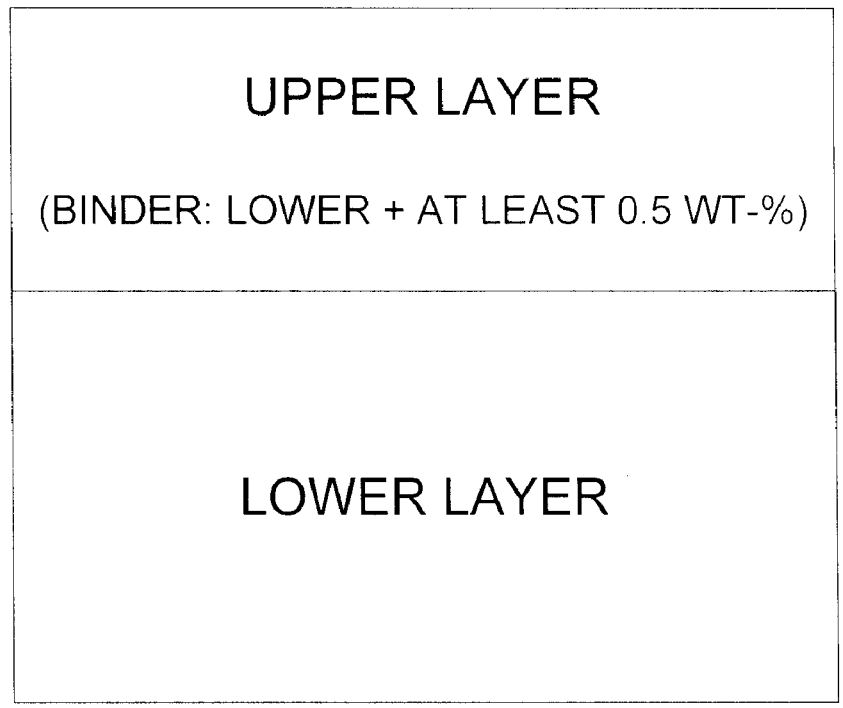

The thickness of each layer of the phosphor layer varies due to desired characteristics of the radiation image conversion panel, the kind of a phosphor, and the like. Normally, the thickness is preferably in a range from 20 to 500 µm, more preferably in a range from 50 to 300 µm. Further, the thickness graininess is regarded as relatively more important, the thickness of the uppermost layer is increased (FIG. 1A), and when sharpness and a quantity of emitted light are regarded as relatively more important, the thickness of the uppermost layer is decreased (FIG. 1B), thereby making it impossible to control the graininess, the sharpness, and the quantity of emitted light.

The phosphor layer is comprised of at least two layers, preferably two to five layers, and more preferably two or three layers. When the phosphor layer is comprised of three layers or more, the relationship between the amounts of binders in other layers than the uppermost layer for the stimulable phosphor is not particularly limited. However, it is preferable that the amounts of binders in these layers be gradually made smaller from top to bottom.

[Stimulable Phosphor]

The stimulable phosphor is, as previously described, a phosphor which exhibits stimulated emission due to stimulating ray being irradiated thereon after being irradiated with radiation. In practical terms, a phosphor which emits stimulated emission in a wavelength range from 300 to 500 nm by stimulating rays in a wavelength range from 400 to 900 nm is desirably used. Preferable examples of the stimulable phosphor include a bivalent europium-activated alkaline earth metal halide based phosphor, a cerium-activated alkaline earth metal halide based phosphor, and a cerium-activated rare earth oxyhalide based phosphor from the standpoint of emitting high-level stimulable emission. On the other hand, the stimulable phosphor used in the present invention is not limited to the above-described examples, and any phosphor which emits stimulated emission when stimulating ray is irradiated thereon after being irradiated with radiation may also be used.

The grain size of the stimulable phosphor is preferably in a range from 1 to 15 µm, more preferably in a range from 2 to 10 µm. If the grain size is less than 1 µm, the quantity of emitted light may decrease. If the grain size is greater than 15 µm, the graininess may deteriorate. Both cases are not preferable.

[Binder]

A thermoplastic elastomer is favorably used as the binder. The thermoplastic elastomer preferably has a softening temperature or melting point of 30 to 150° C. and also has an elastic modulus of 0.3 kgf/mm$^2$ or less (a thermoplastic elastomer having such properties will be hereinafter referred to as "specified thermoplastic elastomer"). An elastomer containing the above-described specified thermoplastic elastomer is preferably used as a principal component of the binder (preferably, at a ratio of 60% or greater of the binder). The specified thermoplastic elastomer is preferably used in a range from 30 to 100% by weight based on the total weight of the elastomer, more preferably in a range from 60 to 100% by weight, and most preferably in a range from 80 to 100% by weight.

The softening temperature or melting point of the thermoplastic elastomer is preferably in a range from 30 to 120° C., more preferably in a range from 30 to 100° C. The softening temperature mentioned in the present invention is Vicat softening temperature.

The elastic modulus of the thermoplastic elastomer is preferably 0.3 kgf/mm$^2$ or less, more preferably 0.1 kgf/ mm$^2$ or less. Further, a lower limit value of the elastic modulus is preferably set to be 0.001 or more.

The tensile strength of the thermoplastic elastomer is generally in a range from 0.1 to 20 kgf/mm$^2$, preferably in a range from 1 to 15 kgf/mm$^2$, and particularly preferably in a range from 1 to 10 kgf/mm$^2$. The tensile elongation percentage of the above-described specified thermoplastic elastomer is generally in a range from 10 to 2000%, preferably in a range from 100 to 1500%, and more preferably in a range from 200 to 1500%.

Specific examples of the thermoplastic elastomer include polystyrene, polyolefine, polyurethane, polyester, polyamide, polybutadiene, ethylene vinyl acetate, polyvinyl chloride, natural rubber, fluorine-contained rubber, polyisoprene, chlorinated polyethylene, styrene-butadiene rubber, and silicon rubber. Among these examples, polyurethane, polyester, and polyolefine are preferably used, and polyurethane is particularly preferable.

As the binder, the above-described specified thermoplastic elastomer may be used alone, or as a mixture of two or more kinds of thermoplastic elastomer. Further, a mixture of two or more kinds of elastomer, comprised of the above-described specified thermoplastic elastomer and other elastomer, may also be used. Moreover, a polymer other than the thermoplastic elastomer (for example, an epoxy resin) may be mixed therewith. Particularly, the epoxy resin is usually used to prevent occurrence of yellowing. In this case, polymers other than the thermoplastic elastomer are used at a ratio of less than 40% by weight based on the total weight of the binder.

A generally known cross linking agent can be added to the binder so that the above-described elastic modulus and tensile strength are each adjusted to a desired value. Examples of the cross linking agent which can be used include polyisocyanate, primary amine, secondary amine, and acid anhydride. The cross linking agent can be suitably selected based on the kind of elastomer or polymer used as the binder, desired properties, and the like. Further, the amount of the cross linking agent added may be suitably adjusted as well.

[Support]

Materials for a support can be arbitrarily selected from a group, for example, consisting of glass, a metallic plate, various materials used as supports for sensitized paper (or intensifying screen) in conventional radiography, and materials generally known as a support for a radiation image conversion panel. Examples of such materials include a plastic film such as cellulose acetate, polyester, polyethylene terephthalate, polyamide, polyimide, triacetate, or polycarbonate; a metal sheet such as aluminium foil or aluminium alloy foil; paper such as plain paper, baryta paper (photographic base paper), resin treated paper, pigment paper containing a pigment such as titanium dioxide, or paper formed by sizing polyvinylalcohol or the like; a plate or sheet of ceramics such as alumina, zirconia, magnesia, and titania; and the like.

As well as a generally known radiation image conversion panel, in order to strengthen bonding of the support and the phosphor layer or to improve sensitivity or image quality (sharpness and graininess) of the radiation image conversion panel, the support can include, on the surface thereof at a side where the phosphor layer is provided, various layers which includes an adhesiveness imparting layer comprised of a polymer such as gelatin, a light reflection layer comprised of light reflecting substances such as titanium dioxide, gadolinium oxide, or the like, a light absorbing layer comprised of light absorbing substances such as carbon black, and the like. The configuration of these layers can be arbitrarily selected in accordance with the purpose and application of a desired radiation image conversion panel.

The support may be, as disclosed in JP-A No. 58-200200, formed in such a manner that micro irregularities are made on the surface thereof at a side which faces the phosphor layer (in a case in which the adhesiveness imparting layer, reflective light layer, or light absorbing layer is provided on the surface of the support at the side which faces the phosphor layer, which surface means the surface of any of these three layers), so as to improve the sharpness of an image to be obtained.

The thickness of the support is not particularly limited, but usually, it is preferably in a range from 75 to 300 µm, more preferably in a range from 150 to 200 µm.

(Protective Layer)

In the radiation image conversion panel of the present invention, a protective layer may be provided on a surface of the phosphor layer, opposite to a side at which the phosphor layer abuts the support, so as to physically and chemically protect the phosphor layer in the same way as in an ordinary radiation image conversion panel.

The protective layer is preferably a transparent protective layer. Examples of material for the protective layer include: cellulose derivatives such as cellulose acetate and nitrocellulose; and synthetic polymers such as polymethylmethacrylate, polyvinylbutyral, polyvinylformal, polycarbonate, polyvinylacetate, vinyl chloride/vinyl acetate copolymer, and fluorine-based resin (for example, fluoro-olefine/vinyl ether copolymer).

The transparent protective layer can be formed by applying, onto the surface of the phosphor layer, a solution prepared by dissolving the above-described synthetic polymer in a suitable solvent. Further, a cross linking agent such as polyisocyanate can be used according to circumstances. Alternatively, the protective layer can be formed, for example, by a method in which a protective layer-forming sheet such as a plastic sheet comprised of polyethylene terephthalate, polyethylene naphthalate, polyethylene, polyvinylidene chloride, or polyamide; or a transparent glass plate is formed separately and bonded to the surface of the phosphor layer using suitable adhesives.

The thickness of the protective layer is not particularly limited. Usually, it is preferably in a range from 0.1 to 20 µm.

(Colored Layer)

In order to improve the sharpness of an image to be obtained, the radiation image conversion panel of the present invention may include a colored layer, which absorbs stimulating ray but does not absorb light of stimulated emission, between any overlapping layers (see Japanese Patent Application Publication (JP-B) No. 59-23400).

(Edge Covering Layer)

In order to further improve conveying-resistant characteristics, particularly, impact resistant and contamination control, the radiation image conversion panel of the present invention may include an edge covering layer at an end (side surface portion) of at least one side of the radiation image conversion panel.

A coating for forming an edge covering layer is not particularly limited. For example, linear polyester or a polymer mixture of linear polyester and vinyl chloride/vinyl acetate copolymer disclosed in JP-A No. 62-3700, organic solvent-soluble fluorine based resin disclosed in JP-A No.

4-2998, and the like can be used. Further, a mixture comprised of a silicone based polymer and a polyisocyanate, of which details are disclosed in JP-A No. 7-140300, may also be used. The radiation image conversion panel in which an edge covering layer is formed by such coating allows achievement of extremely high-level conveying-resistant characteristics, particularly, impact resistance and contamination control.

(Manufacturing of Radiation Image Conversion Panel)

The radiation image conversion panel of the present invention can be manufactured in such a manner as described above, but the present invention is not limited to the same. In a manufacturing method which will be described below, the structure in which the phosphor layer is comprised of two layers will be given as an example, but the structure in which the phosphor layer is comprised of three or more layers can also be given in accordance with the method.

(1) Preparation of Coating Liquid for Forming Phosphor Layer

First, the above-described stimulable phosphor and binder (containing a cross linking agent) were added to a suitable solution for forming a coating liquid and mixed sufficiently, thereby allowing uniform dispersion of the stimulable phosphor in the binder-containing solution. As a result, two types of coating liquid for forming a phosphor layer in which amounts of binders to a stimulable phosphor are different within the above-described range were prepared. A coating liquid in which the amount of a binder to a stimulable phosphor is larger is referred to as coating liquid 1 for forming a phosphor layer, and a coating liquid in which the amount of a binder to a stimulable phosphor is smaller is coating liquid 2 for forming a phosphor layer.

Examples of a solvent for preparing the coating liquid include: lower alcohol such as methanol, ethanol, n-propanol, and n-butanol; chlorine atom-containing hydrocarbons such as methylene chloride and ethylene chloride; ketone such as acetone, methyl ethyl ketone, and methylisobutyl ketone; esters of lower alcohol and lower fatty acid such as methyl acetate, ethyl acetate, or butyl acetate; ethers such as dioxane, ethyleneglycol monoethyl ether, ethyleneglycol monomethyl ether, and tetrahydrofuran; and mixtures thereof.

The coating liquid for forming the phosphor layer may include various additives, for example, a dispersing agent for improving dispersibility of a phosphor in the coating liquid, a plasticizer for improving bonding strength of the phosphor and a binder in a formed phosphor layer, and the like. Examples of the dispersing agent used for the above-described purpose include phthalic acid, stearic acid, caproic acid, and lipophilic surface active agent. Further, examples of the plasticizer include: phosphates such as triphenyl phosphate, tricresyl phosphate, and diphenyl phosphate; phthalate esters such as diethyl phthalate and dimethoxyethyl phthalate; glycolic acid esters such as glycolic acid ethylphthalylethyl, and glycolic acid butylphthalylbutyl; and polyesters of aliphatic dibasic acid and polyethylene glycol such as polyester of triethylene glycol and adipic acid, or polyester of diethylene glycol and succinic acid.

(2) Formation of Phosphor Layer

The phosphor layer-forming coating liquids 1 and 2 thus prepared, which each contain a phosphor and a binder, are uniformly applied onto the surface of a sheet-forming temporary support and coating films of the coating liquids are thereby formed. The coating operation can be conducted by using an ordinary coating method, for example, a doctor blade, a roll coater, or a knife coater. Further, the temporary support can be arbitrarily selected from the same materials as those for the above-described support.

The phosphor layer-forming coating liquids 1 and 2 were respectively applied onto separate temporary supports and dried, and thereafter, dried products were peeled from the temporary supports and phosphor sheets 1 and 2 were prepared as phosphor layers of the radiation image conversion panel. Accordingly, it is preferable that a mold releasing agent be in advance applied onto respective surfaces of the temporary supports so that formed phosphor sheets are easily peeled from the temporary supports.

(3) Bonding of Phosphor Layer to Support

The phosphor sheets 1 and 2 thus obtained were placed on the support in the order of the phosphor sheet 2 and the phosphor sheet 1, and were bonded to the support while being compressed (by thermo-compression bonding) preferably at a temperature higher than or equal to the softening temperature or melting point of the binder, and two-layered phosphor layer were thereby formed.

As a compressor used for the compression processing, generally known devices such as a calendar roll and hot press can be used. For example, the compression processing using the calendar roll is conducted by placing the above-described phosphor sheets on the support and passing them between rollers heated to a temperature higher than or equal to the softening temperature or melting point of the binder at a fixed speed. However, the compressor used in the present invention is not limited to the above-described devices, and any device by which the above-described phosphor sheets can be compressed while being heated may also be used.

A pressure to be set during the compression processing is generally 50 kgw/cm$^2$ or more, preferably 200 to 700 kgw/cm$^2$. A heating temperature (in a case of the compression processing using a calendar roll, the temperature of each of the upper and lower rolls) is, as described above, generally set to be a temperature higher than or equal to the softening temperature or melting point of the binder, preferably a temperature higher than the softening temperature or melting point by 10 to 50° C. Generally, upper and lower pressurizing members which apply pressure (in a case of the compression processing using a calendar roll, upper and lower rolls) are preferably set at the same temperature. A feed speed in the compression processing using a calendar roll is preferably set in a range from 0.1 to 5.0 m/minute.

(4) Formation of Protective Layer and Edge Covering Layer

When necessary, a protective layer is formed on the surface of the phosphor layer and an edge covering layer is formed at an end (side surface portion) of at least one side of the radiation image conversion panel. The protective layer can be formed by a conventionally known method or the above-described method, and the edge covering layer can be formed by a conventionally known method.

The radiation image conversion panel of the present invention can thus be obtained.

EXAMPLES

The present invention will further be described in detail with reference to the following examples, but it is not limited to these examples. In the examples given below, all "parts" indicate "parts by weight" as far as no particular explanation is given.

Example 1

(1) Preparation of Upper-Layer Phosphor Sheet (Composition of Upper-Layer Phosphor Sheet)

| | |
|---|---|
| Phosphor; BaFBr$_{0.85}$I$_{0.15}$: Eu$^{2+}$(grain size: 8 μm) | 1000 parts |
| Binder; | 60 parts |

; polyurethane elastomer (manufactured by Dainippon Ink & Chemicals, Inc.; trade name: Pandex T5265H [solid] 15% MEK solution)
  ; epoxy resin (manufactured by Yuka Shell Epoxy Co., Ltd.; trade name: EP1001 [solid])
  ; polyisocyanate (manufactured by Nihon Polyurethane Co., Ltd.; trade name: Colonate HX)

(A weight-mix ratio of the binder (polyurethane elastomer: epoxy resin: polyisocyanate) is 70:20:10.)

An optimum amount of MEK was added to the material having the above-described composition so that the viscosity becomes 30 Pa·s, and then dispersed and mixed by using a propeller mixer. As a result, a phosphor sheet-forming coating liquid having a viscosity of 30 Pa·s (25° C.) was prepared. This coating liquid was applied onto polyethylene terephthalate (temporary support; thickness: 190 μm) which is applied with a silicon-based mold releasing agent, and then dried. Subsequently, the dried product was peeled from the temporary support and an upper-layer phosphor sheet (thickness: 140 μm) was obtained.

(2) Preparation of Lower-Layer Phosphor Sheet

A lower-layer phosphor sheet (thickness: 140 μm) was prepared in the same way as in the upper-layer phosphor sheet except that an amount of addition of the binder comprised of the composition of the upper-layer phosphor sheet was changed to 50 parts.

(3) Formation of Reflective Layer (Undercoat Layer)

(Composition of Reflective Layer)

| | |
|---|---|
| Fine grains of gadolinium oxide (Gd$_2$O$_3$) (the grain size of grains which amount to 90% by weight of all grains is in a range from 1 to 5 μm) | 30 parts |
| Binder: soft acrylic resin (Cryscoat P-1018GS: 20% solution; manufactured by Dainippon Ink & Chemicals, Inc. | 30 parts |
| Phthalate ester | 3.5 parts |
| Conductive material: ZnO whisker | 10 parts |
| Coloring agent: ultramarine blue | 0.4 parts |

An optimum amount of MEK was added to the material having the above-described composition, and then dispersed and mixed by using a propeller mixer. As a result, a reflective (undercoat) layer-forming coating liquid having a viscosity of 10 Pa·s (20° C.) was prepared. Polyethylene terephthalate (support) having a thickness of 300 μm was horizontally placed on a glass plate and the above-described undercoat layer-forming coating liquid was uniformly applied onto the support, and thereafter, a coating film was dried and a reflective layer (thickness: 20 μm) was formed on the support.

(4) Formation of Phosphor Layer

The previously prepared upper-layer phosphor sheet and lower-layer phosphor sheet were placed on the reflective layer formed on the support in the order of the lower-layer phosphor sheet and the upper-layer phosphor sheet with surfaces thereof, at sides where these phosphor sheets are peeled from the temporary supports, facing each other, and then subjected to thermo-compression bonding. The thermo-compression bonding was continuously conducted by using a calendar roll under the condition that a pressure is 500 Kgw/cm$^2$, the temperature of an upper roll is 90° C., the temperature of a lower roller is 75° C., and a feed rate is 1.0 m/minute. Due to the thermo-compression bonding, the reflective layer formed on the support and the phosphor sheets are completely bonded by fusion to each other, and a two-layered phosphor layer was formed. The thickness of the phosphor layer was made smaller by about 25% and a filling factor of the phosphor thereby became greater.

(5) Formation of Protective Layer (Composition of Protective Layer)

| | |
|---|---|
| Fluorine-based resin: fluoroolefine/vinylether copolymer (Lumifron LF-504X (40% solution), manufactured by Asahi Glass Co., Ltd. | 50 parts |
| Cross linking agent: polyisocyanate (Olestar NP38-70S (70% solution), manufactured by Mitsui Toatsu Chemicals, Inc.) | 9 parts |
| Lubricant: alcohol-denatured silicone (X-22-2809 (66% solution), manufactured by Shin-Etsu Chemical Co., Ltd.) | 0.5 parts |
| Catalyst: dibutyltindilaurate (KS1260, manufactured by Kyodo Chemical Co., Ltd.) | 3 m parts |

The material having the above-described composition was dissolved in an optimum amount of methyl ethyl ketone/cyclohexane (2/8, volume ratio) and a protective layer-forming coating liquid having a viscosity of 0.2 to 0.3 Pa·s was prepared. The protective layer-forming coating liquid was applied onto the above-described phosphor layer, and thereafter, subjected to heat treatment for 30 minutes at 120° C. so as to be thermally hardened, and then dried. As a result, a protective layer having a thickness of 3 μm was provided.

(6) Formation of Edge Covering Layer (Composition of Edge Covering Layer)

| | |
|---|---|
| Silicone-based polymer (polyurethane having polydimethylsiloxane units, Diaroma SP-3023 (15 wt % solution (solvent: mixed solvent of methyl ethyl ketone and toluene)), manufactured by Dainichiseika Colour & Chemicals Mfg. Co., Ltd.) | 70 parts |
| Cross linking agent: polyisocyanate (Crossnate D-70 (50 wt % solution), manufactured by Dainichiseika Colour & Chemicals Mfg. Co., Ltd.) | 3 parts |
| Yellowing inhibitor: epoxy resin (EP1001 [solid]; manufactured by Yuka Shell Epoxy Co., Ltd.) | 0.6 parts |
| Lubricant: alcohol-denatured silicone (X-22-2809 (66% solution), manufactured by Shin-Etsu Chemical Co., Ltd.) | 0.2 parts |

The material having the above-described composition was added to 15 parts of methyl ethyl ketone and dissolved therein, and an edge covering layer-forming coating liquid was prepared. The edge covering layer-forming coating liquid was applied onto side surfaces of a panel comprised of the previously prepared support, undercoat layer, phosphor layer, and protective layer, and then dried completely at room temperature. As a result, an edge covering layer having a film thickness of 25 μm was formed.

In such a manner as described above, a radiation image conversion panel of example 1 comprised of the support, undercoat layer, two-layered phosphor layer, protective layer, and edge covering layer was manufactured.

Examples 2 to 5, Comparative Examples 1 and 2

Radiation image conversion panels of examples 2 to 5 and comparative examples 1 and 2 were each obtained by forming a two-layered phosphor layer as in example 1 except that the grain size of the phosphor, the amount of the binder, and the thickness of each phosphor sheet were changed to values shown in Table 1, which will be given later, in preparation of the upper-layer and lower-layer phosphor sheets.

[Evaluation]

The image qualities (the quantity of emitted light and the graininess) of each of images obtained from the radiation image conversion panels of examples 1 to 5 and comparative examples 1 and 2 were evaluated as follows. The results are shown in Table 1.

Each of the radiation image conversion panel thus prepared was irradiated with X-rays having a tube voltage of 80 KVp from the side of the protective layer, followed by scanning with He—Ne Laser light (having a wavelength of 632.8 nm) to thereby allow the phosphor to be excited. Light of stimulated emission emitted from the phosphor layer was received and converted into an electric signal, and the electric signal was reproduced by an image reproducing device and an image was obtained on a display device. The quantity of light of stimulated emission emitted from the phosphor layer at this time was measured, and a graininess (RM) noise in dosage of 10 mR was measured. In this measurement, a measuring device manufactured by Fuji Photo Film Co., Ltd. (trade name: FCR7000) was used.

stimulable phosphor in uppermost phosphor layer of the phosphor layers is greater than that of the binder to the stimulable phosphor in any other phosphor layer by at least 0.5 wt. %; wherein the radiation image conversion panel is produced by thermo-compressing at least two phosphor sheets, each containing a phosphor layer, which have been separately coated and dried; and the thickness of the uppermost phosphor layer is increased relative to the thickness of a phosphor layer beneath the uppermost phosphor layer.

2. The radiation image conversion panel according to claim 1, wherein the amount of the binder to the stimulable phosphor in the uppermost phosphor layer is greater than that of the binder to the stimulable phosphor in any other phosphor layer by 1 to 100 wt %.

3. The radiation image conversion panel according to claim 1, wherein the stimulable phosphor results a stimulated emission of a wavelength in the range of 300 to 500 nm when the stimulable phosphor is irradiated with stimulating rays of a wavelength in the range of 400 to 900 nm.

4. The radiation image conversion panel according to claim 1, wherein the stimulable phosphor is a phosphor selected from the group consisting of a bivalent europium-activated alkaline earth metal halide phosphor, a cerium-activated alkaline earth metal halide based phosphor, and a cerium-activated rare earth oxyhalide based phosphor.

5. The radiation image conversion panel according to claim 1, wherein the stimulable phosphor has a grain size ranging from 1 to 15 μm.

6. The radiation image conversion panel according to claim 1, wherein the binder is a thermoplastic elastomer.

7. The radiation image conversion panel according to claim 6, wherein the thermoplastic elastomer includes at least one elastomer selected from the group consisting of

TABLE 1

| | Upper-layer phosphor sheet | | | Lower-layer phosphor sheet | | | Radiation image conversion panel | |
|---|---|---|---|---|---|---|---|---|
| | Phosphor grain size (μm) | Amount of binder (parts) | Thickness (μm) | Phosphor grain size (μm) | Amount of binder (parts) | Thickness (μm) | Light emission quantity (%) | Graininess noise (× 10$^{-2}$) |
| Ex. 1 | 8 | 60 | 140 | 8 | 50 | 140 | 100 | 0.27 |
| Ex. 2 | 8 | 70 | 140 | 8 | 50 | 140 | 98 | 0.25 |
| Ex. 3 | 8 | 60 | 100 | 8 | 50 | 180 | 102 | 0.28 |
| Ex. 4 | 8 | 60 | 180 | 8 | 50 | 100 | 100 | 0.26 |
| Ex. 5 | 3 | 60 | 140 | 3 | 50 | 140 | 96 | 0.23 |
| Comp. Ex. 1 | 8 | 50 | 140 | 8 | 50 | 140 | 100 | 0.33 |
| Comp. Ex. 2 | 8 | 50 | 140 | 8 | 60 | 140 | 94 | 0.35 |

Notes: "Ex." means Example, and "Comp. Ex." means Comparative Example.

As can be seen from the results of Table 1, the graininess noise can be reduced by a multi-layered phosphor layer, in which the amount of a binder contained in an upper-layer phosphor layer is made larger, without decreasing the quantity of light emitted from a phosphor. As a result, a radiation image conversion panel having a desired S/N ratio can be obtained.

As described above, the present invention can provide a radiation image conversion panel having a sufficient quantity of light emitted from a phosphor and high graininess.

What is claimed is:

1. A radiation image conversion panel comprising at least two phosphor layers each containing a stimulable phosphor and a binder, wherein an amount of the binder to the polystyrene, polyolefin, polyurethane, polyester, polyamide, polybutadiene, ethylene vinyl acetate, polyvinyl chloride, natural rubber, fluorine-contained rubber, polyisoprene, chlorinated polyethylene, styrene-butadiene rubber, and silicon rubber.

8. The radiation image conversion panel of claim 1, wherein the thickness of each phosphor layer is in the range of 20–500 μm.

9. The radiation image conversion panel of claim 1, wherein the thickness of each phosphor layer is in the range of 50–300 μm.

10. A radiation image conversion panel comprising at least two phosphor layers each containing a stimulable phosphor and a binder, wherein an amount of the binder to the stimulable phosphor in uppermost phosphor layer of the phosphor layers is greater than that of the binder to the stimulable phosphor in any other phosphor layer by at least 0.5 wt. %, wherein the thickness of the uppermost phosphor layer is decreased relative to the thickness of a phosphor layer beneath the uppermost phosphor layer, and wherein the radiation image conversion panel is produced by thermo-compressing at least two phosphor sheets, each containing a phosphor layer, which have been separately coated and dried.

11. The radiation image conversion panel according to claim 10,
wherein said radiation image conversion panel comprises three to five phosphor layers and each phosphor layer contains a stimulable phosphor and a binder; and
wherein the amount of binder in each of said phosphor layers is gradually made smaller from a top layer to a bottom layer.

12. A method of manufacturing a radiation image conversion panel that comprises at least two phosphor layers each containing a stimulable phosphor and a binder, wherein an amount of the binder to the stimulable phosphor in uppermost phosphor layer of the phosphor layers is greater than that of the binder to the stimulable phosphor in any other phosphor layer by at least 0.5 wt %, and wherein the thickness of the uppermost phosphor layer is increased relative to the thickness of a phosphor layer beneath the uppermost phosphor layer, said method comprising the steps of:
providing at least two phosphor sheets of different thicknesses, each containing a stimulable phosphor and a binder, wherein an amount of the binder to the stimulable phosphor in one said phosphor sheet is greater than that of the binder to the stimulable phosphor in any other of said phosphor sheets by at least 0.5 wt % and wherein the sheet having the greater amount of binder is thicker than all of the remaining sheets, and separately coating and drying each of said sheets;
arranging said at least two sheets in layers with the sheet having the greater amount of binder on top, so that the thickness of an uppermost layer is greater than the thickness of a layer beneath the uppermost layer; and
thermo-compressing said at least two sheets each containing a stimulable phosphor and a binder, which have been separately coated and dried, to produce the layered radiation image conversion panel.

13. A method of manufacturing a radiation image conversion panel that comprises at least two phosphor layers each containing a stimulable phosphor and a binder, wherein an amount of the binder to the stimulable phosphor in uppermost phosphor layer of the phosphor layers is greater than that of the binder to the stimulable phosphor in any other phosphor layer by at least 0.5 wt %, and wherein the thickness of the uppermost phosphor layer is decreased relative to the thickness of a phosphor layer beneath the uppermost phosphor layer, said method comprising the steps of:
providing at least two phosphor sheets of different thicknesses, each containing a stimulable phosphor and a binder, wherein an amount of the binder to the stimulable phosphor in one said phosphor sheet is greater than that of the binder to the stimulable phosphor in any other of said phosphor sheets by at least 0.5 wt % and wherein the sheet having the greater amount of binder is thinner than all of the remaining sheets, and separately coating and drying each of said sheets;
arranging said at least two sheets in layers with the sheet having the greater amount of hinder on top, so that the thickness of an uppermost layer is less than the thickness of a layer beneath the uppermost layer; and
thermo-compressing said at least two sheets each containing a stimulable phosphor and a binder, which have been separately coated and dried, to produce the layered radiation image conversion panel.

\* \* \* \* \*